United States Patent Office 3,064,052
Patented Nov. 13, 1962

3,064,052
SYMMETRICAL ALICYCLIC AMINE DERIVATIVES
Moses Wolf Goldberg, Upper Montclair, and Sidney Teitel, Nutley, N.J., assignors to Hoffmann-La Roche Inc., Nutley, N.J., a corporation of New Jersey
No Drawing. Filed Apr. 17, 1958, Ser. No. 729,077
11 Claims. (Cl. 260—563)

This invention relates to symmetrical alicyclic amine derivatives. More particularly, the invention relates to amine derivatives which can be represented by the following structural formula:

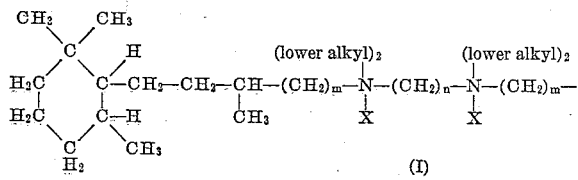 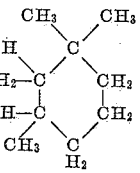

wherein $m$ represents 0 or 1, $n$ represents an integer from 2 to 12 and X represents an acid anion.

The lower alkyl groups in the above formula include such groups as methyl, ethyl, proyl, isopropyl, etc. The acid anions in Formula I are anions of medicinally acceptable inorganic or organic acids such as the anions of the mineral acids, e.g. sulfate, phosphate, nitrate, the halides, for example, chloride, bromide, iodide, etc., or the anions of organic acids such as benzenesulfonate, toluenesulfonate, citrate, tartrate, etc. The halides, and especially the chloride, are preferred. In the compounds represented by the above structural formula, the lower alkyl groups are the same, the two acid anion groups are the same and $m$ has the same value in each part of the molecule, so that in each instance the compound is structurally symmetrical. It is understood, however, that compounds of Formula I can exist in different spatial configurations, which are also within the scope of this invention.

When $m=0$ in Formula I, the compounds may be synthesized from β-ionone; when $m=1$, the compounds may be synthesized from 4-(2,6,6-trimethyl-1-cyclohexen-1-yl)-2-methyl - 2 - buten-1-al, [β-$C_{14}$-aldehyde]. Two alternate routes may be followed. For example, β-ionone is reductively condensed with methylamine in the presence of a reducing catalyst such as Raney nickel to obtain the corresponding secondary amine, [1-methyl-3-(2,6,6-trimethyl-1-cyclohexen - 1-yl)propyl]methylamine. When β-$C_{14}$ aldehyde is used, [2-methyl-4-(2,6,6-trimethyl-1-cyclohexen-1-yl)butyl]methylamine is obtained. The secondary amine is converted to a tertiary alkyl amine by treatment, for example, with formic acid-formaldehyde. The double bond of the cyclohexene ring is then catalytically reduced, e.g. with a platinum catalyst. The appropriate α,ω-dihaloalkane is then reacted with two equivalents of the saturated tertiary amine to give the desired symmetrical compound of Formula I.

Alternatively, the saturated ketone, e.g. cis-tetrahydroionone, is reductively condensed in the presence of Raney nickel or a noble metal catalyst with one-half equivalent of the appropriate α,ω-diaminoalkane to obtain a saturated diamine. For example, when cis-tetrahydroionone is reductively condensed with one-half equivalent of 1,6-hexanediamine, N,N'-bis[1 - methyl - 3-(2,2,6-trimethylcyclohexyl)-propyl]-1,6-hexanediamine is obtained. Reacting the saturated diamine, for example with formic acid-formaldehyde, converts it to the di-tertiary amine. The latter is then quaternized by treatment with an excess of a quaternizing agent containing the appropriate alkyl group and acid anion, e.g. an alkyl halide such as methyl chloride.

The novel secondary and tertiary amines and their acid addition salts, formed from inorganic or organic acids, particularly the mineral acids, which are used as intermediates are also part of this invention.

The compounds of this invention are useful as antimicrobial agents, for example, in combatting infections due to bacteria, such as Streptococci and Staphylococci (including Staphylococcus strains resistant to antibiotics) and protozoa such as *Trichomonas vaginalis*. These substances may be applied topically, for example in the form of creams, lotions, ointments, etc., or may be administered parenterally, for example, in a sterile medium such as water, by incorporating therapeutic dosages in carriers, excipients, etc. according to accepted practice.

The following examples are illustrative of the invention. All temperatures are stated in degrees centigrade.

*Example 1*

Five tsp. of Raney nickel catalyst were added to a solution of 250 g. of β-ionone and 200 g. of anhydrous methylamine in 400 ml. of methanol. The mixture was hydrogenated at 150° and at a pressure of 1500 p.s.i. The catalyst was filtered off, the excess methylamine and methanol were distilled off and the residual oil was fractionated in vacuo to give [1-methyl-3-(2,6,6-trimethyl-1-cyclohexen-1-yl)propyl]methylamine, B.P. 117–119° at 5 mm.

To 62 g. of [1-methyl-3-(2,6,6-trimethyl-1-cyclohexen-1-yl)propyl]methylamine, dissolved in 38 ml. of 90% forimc acid, were added 28.5 ml. of 35% formaldehyde. The solution was stirred on a steam bath for 3 hours, and the excess formaldehyde and formic acid were distilled off. The residual oil was made strongly alkaline with 50% potassium hydroxide and then extracted with ether. The ether extract was washed with water, dried and the ether was distilled off. The residual oil was fractionated in vacuo to give [1-methyl-3-(2,6,6-trimethyl-1-cyclohexen-1-yl)propyl]dimethylamine, B.P. 97–99° at 2 mm. An alcoholic solution of the latter, when treated with hydrogen chloride, gave the crystalline hydrochloride, M.P. 69–71° (crystallized from acetonitrile-ether).

To 4.0 g. of platinum oxide in 100 ml. of glacial acetic acid were added 62 g. (0.24 mol) of [1-methyl-3-(2,6,6-trimethyl-1-cyclohexen-1-yl)propyl]dimethylamine hydrochloride and the volume was adjusted to 300 ml. with glacial acetic acid. The mixture was hydrogenated at 100° and at pressure of 1000 p.s.i. The catalyst was filtered off and the colorless filtrate was concentrated, at steam temperature and water vacuum, until a syrup remained. The latter was triturated with ether and crystallized from ethanol-ether. The [1-methyl-3-(2,2,6-trimethylcyclohexyl)propyl]dimethylamine hydrochloride melted at 125–127°. It is hygroscopic.

The hydrochloride obtained above was dissolved in water, neutralized with aqueous sodium hydroxide and the mixture was extracted with ether. The ether was distilled off to obtain the free base, [1-methyl-3-(2,2,6-trimethylcyclohexyl)propyl]dimethylamine.

To 4.0 g. (17.8 m mol) of [1-methyl-3-(2,2,6-trimethylcyclohexyl)propyl]dimethylamine were added 1.79 g. (8.9 m mols) of 1,3-dibromopropane, dissolved in 30 ml. of acetonitrile, and the mixture was refluxed. The mixture became homogeneous at reflux temperature. After 18 hours, the solution was cooled, and the resulting straw yellow solution was concentrated, at steam temperature and water vacuum, until a syrup was obtained. The latter was crystallized from acetonitrile-ether to obtain N,N'-bis[1-methyl-3-(2,2,6-trimethylcyclohexyl)propyl]-N,N'-dimethyl-1,3-propanediamine bis(methobromide). Upon recrystallization from acetonitrile-ether, the compound melted at 214–216°, with decomposition.

*Example 2*

4.5 g. (0.02 mol) of [1-methyl-3-(2,2,6-trimethylcyclohexyl)-propyl]dimethylamine and 2.3 g. (0.01 mol) of 1,5-dibromopentane were reacted according to the procedure in the last paragraph of Example 1 to obtain N,N'-bis[1-methyl-3-(2,2,6-trimethylcyclohexyl)-propyl]-N,N'-dimethyl-1,5-pentanediamine bis(methobromide), M.P. 253–155° with decomposition (crystallized from methanol-acetonitrile).

*Example 3*

22.5 g. (0.1 mol) of [1-methyl-3-(2,2,6-trimethylcyclohexyl)-propyl]dimethylamine and 12.2 g. (0.05 mol) of 1,6-dibromohexane in 100 ml. of acetonitrile were reacted according to the procedure described in the last paragraph of Example 1 to obtain N,N'-bis[1-methyl-3-(2,2,6-trimethylcyclohexyl)propyl]-N,N'-dimethyl-1,6-hexanediamine bis(methobromide), M.P. 265–266° (crystallized from methanol-acetonitrile-ether).

*Example 4*

To a solution of 49 g. (0.25 mol) of cis-tetrahydroionone and 14.1 g. (0.12 mol) of 1,6-hexanediamine in 150 ml. of ethanol was added 1 teaspoon of Raney nickel. The volume was adjusted to 300 ml. with ethanol and the mixture was hydrogenated at 50° and a pressure of 200 p.s.i. The catalyst was filtered off, the filtrate was concentrated and the residual oil fractionated in vacuo to obtain N,N'-bis[1-methyl-3-(2,2,6-trimethylcyclohexyl)propyl]-1,6-hexanediamine; B.P. 192–202° at 0.02 mm.

An aliquot, when treated with alcoholic hydrogen chloride, gave N,N'-bis[1-methyl-3-(2,2,6-trimethylcyclohexyl)propyl]-1,6-hexanediamine dihydrochloride; M.P. 197–199° (crystallized from ethanol-ether).

To 217 g. (0.456 mol) of N,N'-bis[1-methyl-3-(2,2,6-trimethylcyclohexyl)propyl]-1,6-hexanediamine were added 182 ml. (3.04 mols) of formic acid (90%). The resulting colorless solution was cooled, then 91.3 ml. (1.043 mols) of formaldehyde (37%) were added. The solution was heated at steam temperature with occasional shaking for 2 hours and then refluxed for 8 hours. The volatiles were distilled off at steam temperature under water vacuum and the residual oil was made strongly alkaline with 50% potassium hydroxide. The reaction product was extracted with ether. The ether extract was washed with water, dried and concentrated in vacuo. The residual oil was fractionated in vacuo to obtain N,N'-bis[1-methyl-3-(2,2,6-trimethylcyclohexyl)propyl]-N,N'-dimethyl-1,6-hexanediamine, B.$_{0.4}$ 230–240°, $n_D^{26}$ 1.4833. An aliquot, when treated with an ethanolic hydrogen chloride, gave the crystalline dihydrochloride, M.P. 183–185° (recrystallized from ethanolacetonitrile).

To 5 g. of N,N'-bis[1-methyl-3-(2,2,6-trimethylcyclohexyl)propyl]-N,N'-dimethyl-1,6-hexanediamine, dissolved in 150 ml. of acetone, were added 50 ml. of a 40% solution of methyl bromide in acetone. The solution was stored overnight at room temperature. The crystals which had formed were filtered off, washed with acetone and dried to obtain N,N'-bis[methyl-3-(2,2,6-trimethylcyclohexyl)propyl]-N,N'-dimethyl-1,6-hexanediamine bis(methobromide), M.P. 265–266°.

The reductive condensation described in the first paragraph of this example was repeated using instead of Raney nickel catalyst (1) 1.5 g. of platinum oxide and in a separate experiment (2) 1.5 g. of 10% palladium-on-calcium carbonate to obtain the same product, N,N'-bis[1-methyl-3-(2,2,6-trimethylcyclohexyl)propyl]-1,6-hexanediamine.

*Example 5*

To 5 g. of N,N'-bis[1-methyl-3-(2,2,6-trimethylcyclohexyl)propyl]-N,N'-dimethyl-1,6-hexanediamine dissolved in 100 ml. of methanol, at 4°, were added 100 ml. methanol containing 10 g. of methyl chloride. The solution was heated in a closed vessel at 60° for 15 hours. The colorless solution was concentrated and the resulting white solid crystallized from ethanol-acetonitrile-ether to obtain N,N'-bis[1-methyl-3-(2,2,6-trimethylcyclohexyl)propyl]-N,N'-dimethyl-1,6-hexanediamine bis(methochloride) hemihydrate.

*Example 6*

To 5 g. of N,N'-bis[1-methyl-3-(2,2,6-trimethylcyclohexyl)propyl]-N,N'-dimethyl-1,6-hexanediamine, dissolved in 100 ml. of methanol, were added 10 g. of methyl p-toluenesulfonate, dissolved in 100 ml. of acetone. The resulting solution was refluxed for 18 hours, concentrated, and the syrup crystallized from acetonitrile-acetone-ether to obtain N,N'-bis[1-methyl-3-(2,2,6-trimethylcyclohexyl)propyl]-N,N'-dimethyl-1,6-hexanediamine bis(methyl p-toluenesulfonate), M.P. 191–193°.

*Example 7*

To 0.5 g. of N,N'-bis[1-methyl-3-(2,2,6-trimethylcyclohexyl)propyl]-N,N'-dimethyl-1,6-hexanediamine bis(methobromide), dissolved in 100 ml. of water, was added an excess of dilute nitric acid. A white precipitate formed. It was filtered off, washed with water and recrystallized from 25% ethanol to obtain N,N'-bis[1-methyl-3-(2,2,6-trimethylcyclohexyl)propyl]-N,N'-dimethyl-1,6-hexanediamine bis(methyl nitrate), M.P. 287–288°, with decomposition.

*Example 8*

4.0 g. (17.8 mmols) of [1-methyl-3-(2,2,6-trimethylcyclohexyl)propyl]dimethylamine and 2.4 g. (8.9 mmols) of 1,8-dibromooctane were reacted according to the procedure described in the last paragraph of Example 1 to obtain N,N'-bis[1-methyl-3-(2,2,6-trimethylcyclohexyl)propyl]-N,N'-dimethyl-1,8-octanediamine bis(methobromide), M.P. 216–217°, with decomposition (crystallized from acetonitrile-ether).

*Example 9*

4.0 g. (17.8 mmols) of [1-methyl-3-(2,2,6-dimethylcyclohexyl)propyl]dimethylamine and 2.7 g. (8.9 mmols) of 1,10-dibromodecane were reacted according to the procedure described in the last paragraph of Example 1 to obtain N,N'-bis[1-methyl-3-(2,2,6-trimethylcyclohexyl)propyl]N,N'-dimethyl-1,10-decanediamine bis(methobromide), M.P. 197–199° (crystallized from ethanolacetone-ether).

*Example 10*

To a solution of 200 g. of 4-(2,6,6-trimethyl-1-cyclohexen-1-yl)-2-methyl-2-buten-1-al and 115 g. of anhydrous methylamine in 300 ml. of methanol were added three teaspoons of Raney nickel catalyst. The mixture was hydrogenated at 150° and a pressure of 1500 p.s.i. The catalyst was filtered off, and the excess methylamine and methanol were distilled off. To the residual oil, dissolved in 114 ml. of 90% formic acid, were added 85.5 ml. of 35% formaldehyde. The solution was stirred on a steam bath for 3 hours, and the excess formaldehyde and formic acid were distilled off. The residual oil was made strongly alkaline with 30% sodium hydroxide and the mixture was extracted with ether. The ether extract was washed with water, dried with potassium carbonate and the ether was distilled off. The residual oil was fractionated in vacuo to give N-[2-methyl-4-(2,6,6-trimethyl-1-cyclohexen-1-yl)-butyl]dimethylamine, B.P. 100° at 0.4 mm. When treated with alcoholic hydrogen chloride, the crystalline hydrochloride was obtained, M.P. 150–151° (crystallized for acetonitrile-ether).

50 g. of N-[2-methyl-4-(2,6,6-trimethyl-1-cyclohexen-1-yl)-butyl]dimethylamine hydrochloride and 3.5 g. of platinum oxide in 100 ml. of glacial acetic acid were hydrogenated according to the procedure described in the third paragraph of Example 1 to give N-[2-methyl-4-(2,2,6-trimethylcyclohexyl)butyl]dimethylamine hydrochloride, M.P. 159–160°. The latter, when neutralized with aqueous sodium hydroxide, gave the free base, N-[2-methyl-4-(2,2,6-trimethylcyclohexyl)butyl]dimethylamine.

8.1 g. (0.034 mol) of N-[2-methyl-4-(2,2,6-trimethylcyclohexyl)butyl]dimethylamine and 4.1 g. (0.018 mol) of 1,6-dibromohexane were reacted according to the procedure described in the last paragraph of Example 1 to obtain N,N'-bis[2-methyl-4-(2,2,6-trimethylcyclohexyl)butyl]-N,N'-dimethyl-1,6-hexanediamine bis(methobromide), M.P. 235–237° with decomposition (crystallized from ethanol-ether).

*Example 11*

To 20 g. of N,N'-bis[1-methyl-3-(2,2,6-trimethylcyclohexyl)propyl]-N,N'-dimethyl-1,6-hexanediamine, dissolved in 250 ml. of ethanol, were added 21.8 g. of ethyl bromide. The solution was heated at 80° for 15 hours. The volatiles were distilled off and the residue was crystallized from acetone-ether to give N,N'-bis[1-methyl-3-(2,2,6-trimethylcyclohexyl)propyl]-N,N'-dimethyl-1,6-hexanediamine bis(ethobromide), M.P. 196–198°.

We claim:

1. A compound represented by the formula

[structural formula]

wherein:

$m$ represents an integer from 0 to 1,
$n$ represents an integer from 2 to 12, and
$X$ represents a medicinally acceptable acid anion.

2. A compound represented by the formula

[structural formula]

wherein halogen represents a member selected from the group consisting of chlorine, bromine, and iodine.

3. N,N'-bis[1-methyl-3-(2,2,6-trimethylcyclohexyl)propyl]-N,N'-dimethyl-1,6-hexanediamine bis (lower alkylhalide), said halide being selected from the group consisting of chloride, bromide, and iodide.

4. N,N'-bis[1-methyl-3-(2,2,6-trimethylcyclohexyl)propyl]-N,N'-dimethyl-1,6-hexanediamine bis(methochloride).

5. A compound selected from the group consisting of bases represented by the formula

[structural formula]

wherein:

$m$ represents an integer from 0 to 1 and
$n$ represents an integer from 2 to 12.

6. N,N'-bis[1-methyl-3-(2,2,6-trimethylcyclohexyl)propyl]-1,6-hexanediamine.

7. N,N'-bis[1-methyl-3-(2,2,6-trimethylcyclohexyl)propyl]-1,6-hexanediamine dihydrochloride.

8. A compound selected from the group consisting of bases represented by the formula

[structural formula]

wherein:

$m$ represents an integer from 0 to 1 and
$n$ represents an integer from 2 to 12.

9. A compound represented by the formula

[structural formula]

10. N,N'-bis[1-methyl - 3 - (2,2,6-trimethylcyclohexyl)propyl]-N,N'-dimethyl-1,6-hexanediamine.

11. N,N'-bis[1-methyl - 3 - (2,2,6-trimethylcyclohexyl)propyl]-N,N'-dimethyl - 1,6 - hexanediamine dihydrochloride.

References Cited in the file of this patent
UNITED STATES PATENTS

| | | |
|---|---|---|
| 2,736,746 | Goldberg et al. | Feb. 28, 1956 |
| 2,736,747 | Goldberg et al. | Feb. 28, 1956 |
| 2,767,168 | Cheney | Oct. 16, 1956 |
| 2,795,612 | Luduena | June 11, 1957 |
| 2,933,530 | Kralt et al. | Apr. 19, 1960 |